United States Patent [19]

Nathoo et al.

[11] Patent Number: 5,670,101

[45] Date of Patent: Sep. 23, 1997

[54] PROCESS TO PREPARE FOAMS FROM HIGH INTERNAL PHASE EMULSIONS

[75] Inventors: Nazim Safarali Nathoo; Thomas Fairchild Brownscombe; Ronald Marshall Bass, all of Houston, Tex.

[73] Assignee: Shell Oil Company, Houston, Tex.

[21] Appl. No.: 591,991

[22] Filed: Jan. 26, 1996

[51] Int. Cl.[6] ............................................. B29C 44/24
[52] U.S. Cl. ............... 264/45.8; 264/46.6; 264/171.13; 264/171.23
[58] Field of Search ............... 264/45.8, 46.1, 264/171.13, 171.23, 46.6; 425/4 C; 156/185

[56] References Cited

U.S. PATENT DOCUMENTS

| | | | |
|---|---|---|---|
| 3,325,573 | 6/1967 | Boon et al. | 425/4 C |
| 3,366,719 | 1/1968 | Lueders | 264/45.8 |
| 3,462,523 | 8/1969 | Marzocchi et al. | 264/45.8 |
| 3,585,680 | 6/1971 | Eisenmann | 425/4 C |
| 3,596,313 | 8/1971 | Darmochwal | 425/4 C |
| 3,761,209 | 9/1973 | Hanton | 425/4 C |
| 3,768,937 | 10/1973 | Haga et al. | 264/45.8 |
| 3,989,869 | 11/1976 | Neumaier et al. | 264/45.8 |
| 4,017,245 | 4/1977 | Lang | 264/46.1 |
| 4,080,125 | 3/1978 | Vinas | 425/4 C |
| 4,107,107 | 8/1978 | Mendelsohn et al. | 264/45.8 |
| 4,134,782 | 1/1979 | Straughan | 264/45.8 |
| 4,278,624 | 7/1981 | Kornylak | 425/4 C |
| 4,464,425 | 8/1984 | Voight et al. | 264/46.1 |
| 4,478,663 | 10/1984 | O'Sullivan | 264/293 |
| 4,522,953 | 6/1985 | Barby et al. | 521/64 |
| 4,559,003 | 12/1985 | Poncet | 264/45.8 |
| 4,572,865 | 2/1986 | Gluck et al. | 264/46.3 |
| 5,149,720 | 9/1992 | DesMarais et al. | 521/63 |
| 5,198,472 | 3/1993 | DesMarais et al. | 521/63 |
| 5,250,576 | 10/1993 | DesMarais et al. | 521/63 |

*Primary Examiner*—Allan R. Kuhns
*Attorney, Agent, or Firm*—Del S. Christensen

[57] ABSTRACT

A process is provided for curing a high internal phase emulsion to form a porous crosslinked polymeric material is provided, comprising the steps of: forming a high internal phase emulsion having at least one curable phase; providing a continuous strip of a polymeric film wherein the polymeric film is incompatible with each of the phases of the emulsion; placing at least a portion of the emulsion continuously on the polymeric film; closing the polymeric film around the film; and curing the emulsion within the polymeric film. Apparatuses to perform this process are also disclosed.

2 Claims, 2 Drawing Sheets

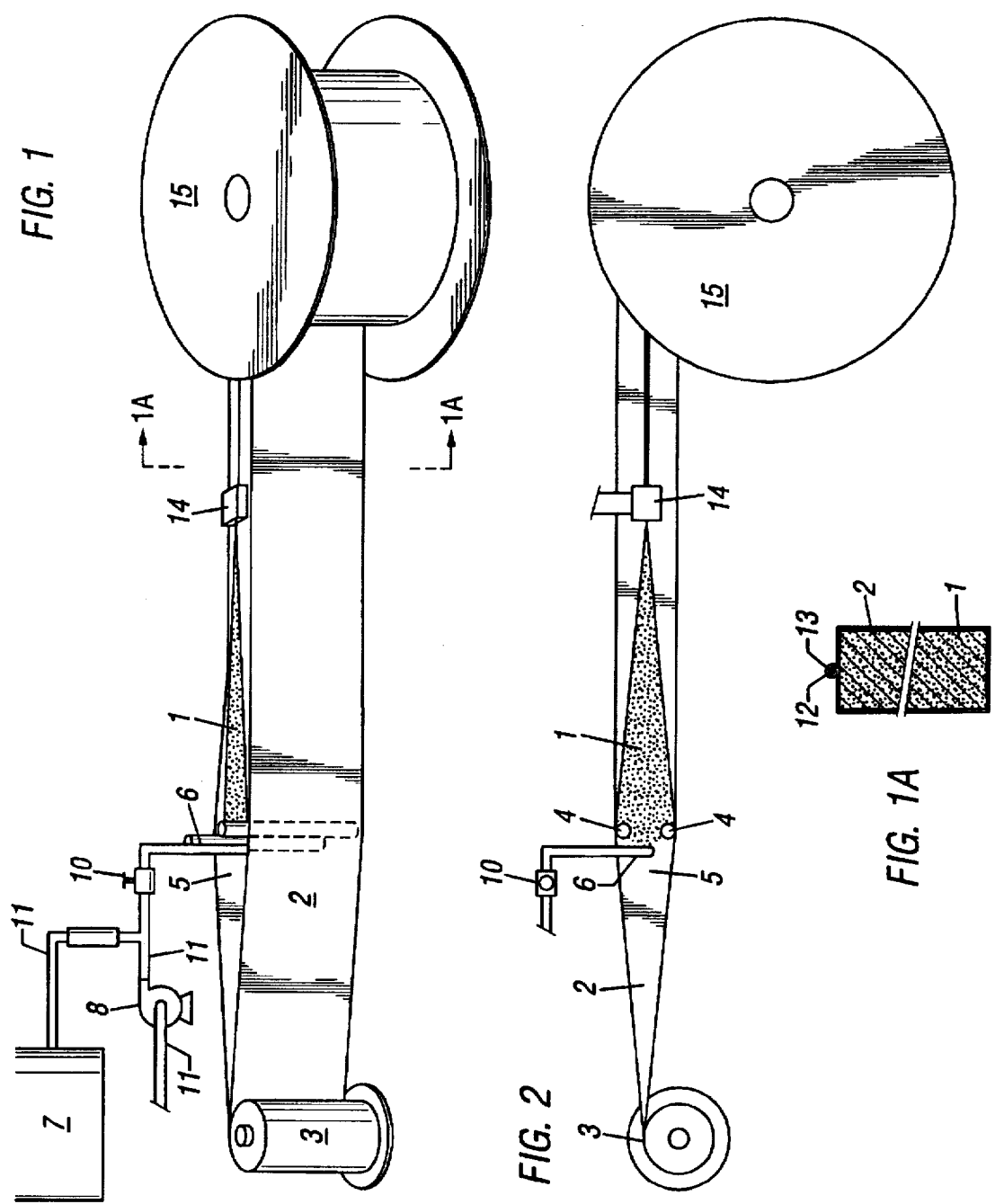

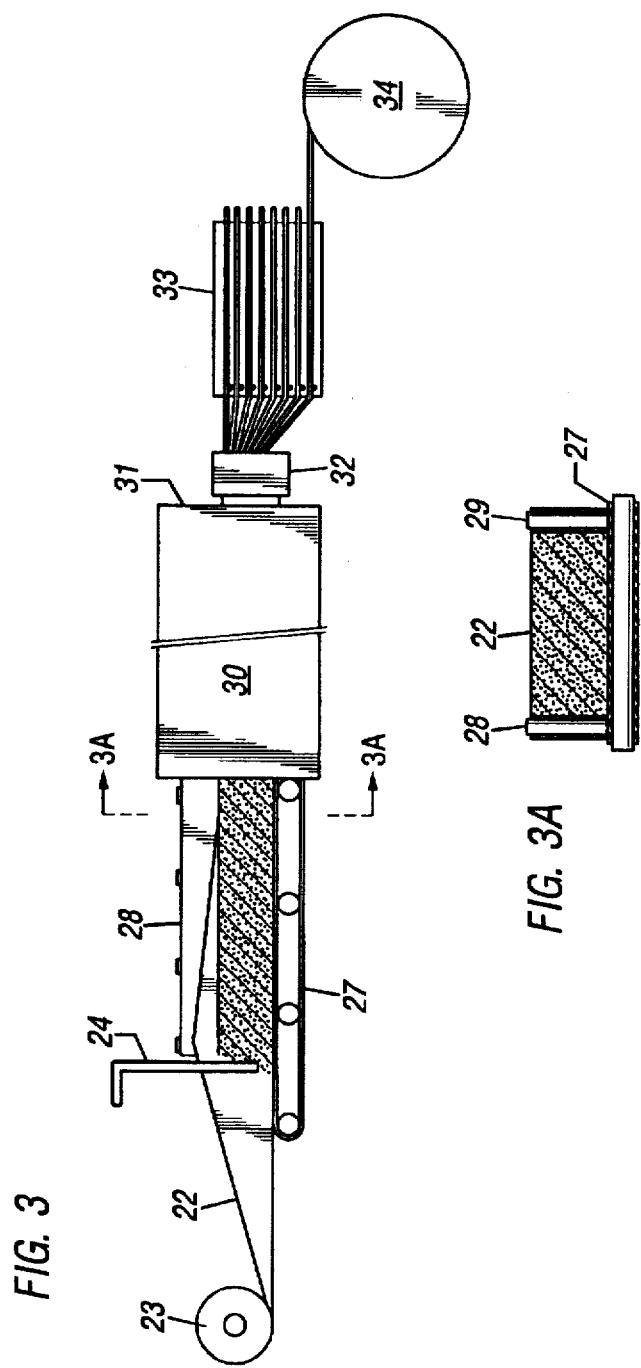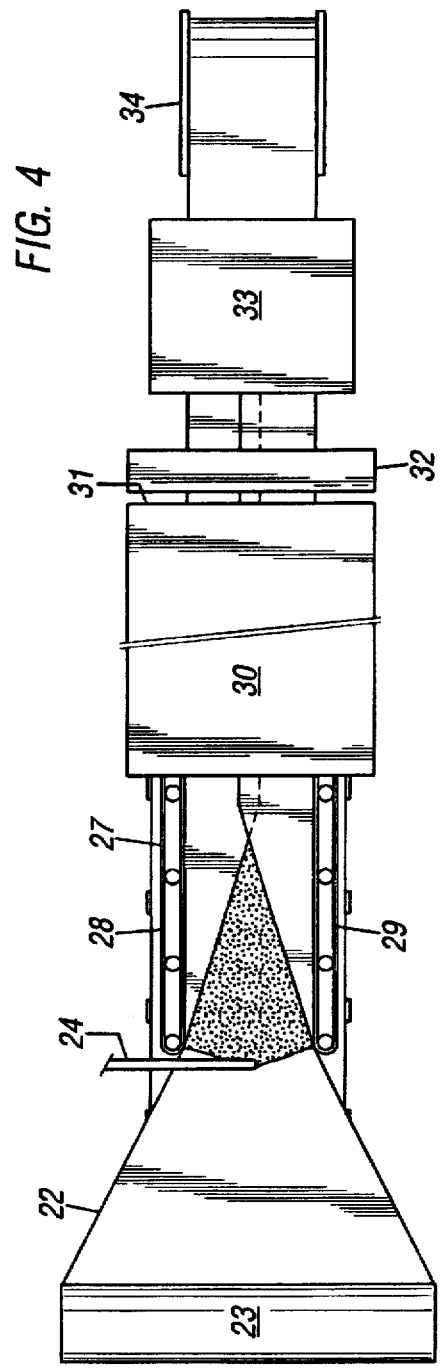

PROCESS TO PREPARE FOAMS FROM HIGH INTERNAL PHASE EMULSIONS

FIELD OF THE INVENTION

This invention relates to a process to prepare foam compositions from high internal phase emulsions wherein the non-internal phase is a polymerizable composition.

BACKGROUND OF THE INVENTION

Polymeric foams can be generally classified as either closed-cell foams or as open-cell foams. Open-cell foams can be used as a matrix to contain various liquids and gases. They are suitable for various applications such as, for example, use in wipes and diapers, as carriers and ion exchange resins. For some of these applications, it is desirable to have porous crosslinked polymer blocks which have a very low density and a high capacity of absorbing and retaining liquids. Such high absorption capacity, low density, porous polymer blocks can be prepared by polymerizing a specific type of water-in-oil emulsion known as high internal phase emulsion having relatively small amounts of a continuous oil phase and relatively greater amounts of an internal water phase.

Such high absorption capacity, low density, foams are prepared by a process disclosed in U.S. Pat. No. 4,522,953 by polymerizing and crosslinking monomers in the continuous oil phase of a high internal phase water-in-oil emulsion with a polymerization initiator such as potassium persulfate. Generally, these high internal phase water-in-oil emulsions contain at least 90 weight percent of a water phase as the internal phase. The high ratio water-in-oil emulsions are formed by combining the oil phase with water under moderate shear. In order to obtain this high internal phase water-in-oil emulsion, a surfactant is used to stabilize the emulsion. It is also advantageous to incorporate an electrolyte into the aqueous phase. The amount and type of electrolyte, along with the amount and type of surfactant, effects the pore size, and wicking ability of the cured foam.

Foams prepared from high internal phase emulsions are generally cured at temperatures of forty to seventy degrees centigrade for periods of several hours. In a laboratory scale, this is easily accomplished. Scale up to a reasonable commercial scale is a significant challenge. Curing and handling individual tubs of emulsion and foam would be slow and labor intensive.

U.S. Pat. No. 5,250,576, issued to Des Marais et al. on Oct. 5, 1993, 5,198,472, issued to Des Marais et al. on Mar. 30, 1993, and 5,149,720, issued to Des Marais et al. on Sep. 22, 1992, disclose a continuous process to prepare a high internal phase emulsion for curing into foam compositions, but the emulsions are continuously poured into "polymerization containers" and cured in the individual containers. Thus, preparation of the emulsion in a continuous fashion is known, but curing remains a slow and labor intensive operation.

It is therefore an object of the present invention to provide a method to prepare foams from of high internal phase emulsions wherein the method can be readily automated and operated on a large scale.

In another aspect, it is an object of the present invention to provide an apparatus wherein emulsions can be cured in large volumes.

SUMMARY OF THE INVENTION

According to the present invention, a process for curing a high internal phase emulsion to form a porous crosslinked polymeric material is provided, the process comprising the steps of:

forming a high internal phase emulsion having at least one curable phase;

providing a continuous strip of a polymeric film wherein the polymeric film is incompatible with each of the phases of the emulsion;

placing at least a portion of the emulsion continuously on the polymeric film;

closing the polymeric film around the film; and curing the emulsion within the polymeric film.

In another aspect of the present invention, apparatuses capable of performing this method are also claimed.

This method provides for continuous curing of an emulsion, and therefore is more readily scaled up to commercial operations.

BRIEF DESCRIPTION OF THE DRAWINGS

FIG. 1 is a schematic drawing of on embodiment of the present invention.

FIG. 1A is a crossection of emulsion in a polymeric film of FIG. 1.

FIG. 2 is a top view of the embodiment of the present invention of FIG. 1.

FIGS. 3 and 4 are, respectively, side and top schematic views of an alternative embodiment of the present invention.

FIG. 3A is a crosssectional view of emulsion in a polymeric film of FIG. 3.

DETAILED DESCRIPTION OF THE INVENTION

An emulsion according to the present invention is produced by forming a first curable water-in-oil high internal phase emulsion by gradually adding and mixing an aqueous solution optionally containing an electrolyte into a monomer solution (oil phase) containing a mixture of polymerizable monomers and a surfactant. A polymerization initiator is added either in the monomer solution or the aqueous solution before mixing or after formation of the emulsion depending on the desired process conditions. The curable water-in-oil high internal phase emulsion is then cured (polymerized and crosslinked) by heating the emulsion at a temperature of at least about 25° C. for a time effective to cure the monomers.

The mixture of polymerizable monomers generally contains one or more vinyl monomers and one or more crosslinking agents. Various monomers may be used in the preparation of the foams, provided the monomers can be dispersed in or form an oil phase of a water-in-oil high internal phase emulsion (oil-soluble) and have a polymerizable vinyl group. Suitable vinyl monomers include, for example, monoalkenyl arene monomers such as styrene, α-methylstyrene, chloromethylstyrene, vinylethylbenzene and vinyl toluene; acrylate or methacrylate esters such as 2-ethylhexyl acrylate, n-butyl acrylate, isobutyl acrylate, t-butyl acrylate, hexyl acrylate, n-butyl methacrylate, lauryl methacrylate, and isodecyl methacrylate; conjugated diolefins such as butadiene, isoprene, and piperylene; allenes such as allene, methyl allene and chloroallene; olefin halides such as vinyl chloride, vinyl fluoride and polyfluoro-olefins; and mixtures thereof.

Suitable crosslinking agents can be any multifunctional unsaturated monomers capable of reacting with the vinyl monomers. The crosslinking agents contain at least two functional groups. The functionality can be, for example, vinyl groups, acrylate groups and methacrylate groups. Multifunctional unsaturated crosslinking monomers include, for example, difunctional unsaturated crosslinking monomers such as divinylbenzene, diethylene glycol dimethacrylate, 1,3-butanediol dimethacrylate, and allyl methacrylate and tri-, tetra- and penta-functional unsaturated crosslinking monomers such as trimethylolpropane trimethacrylate, pentaerythritol tetramethacrylate, trimethylolpropane triacrylate, and pentaerythritol tetraacrylate, glucose pentaacrylate, glucose diethylmercaptal pentaacrylate, and sorbitan triacrylate; and poly-functional unsaturated crosslinking monomers such as polyacrylates (e.g. sucrose per(meth)acrylate and cellulose (meth)acrylate). Crosslinking monomers are typically present in each emulsion in an amount of from about 2 weight percent to about 70 weight percent, preferably from about 5 weight percent to about 40 weight percent based on the total monomer mixture. Some of these crosslinking monomers can be incorporated as a non-crosslinked monomer as long as at least about 2 weight percent of the crosslinking monomers are crosslinked.

Divinylbenzene is a preferred crosslinking monomer, and is typically available as a mixture with ethylstyrene in proportions of about 55:45 by weight. These proportions can be modified so as to enrich the oil phase with one or the other component. Generally, it is advantageous to enrich the mixture with ethylstyrene which simultaneously reducing the amount of styrene in the monomer blend. The preferred ratio of divinylbenzene to ethyl styrene is from about 30:70 to 55:45, and most preferably from about 35:65 to about 45:55, by weight. The inclusion of higher levels of ethylstyrene imparts greater toughness without increasing the $T_g$ of the resulting copolymer to the degree that styrene does.

Suitable polymerization initiators can be water-soluble or oil-soluble. Water-soluble initiators include, for example, persulfates such as potassium or sodium persulfate and various redox systems such as ammonium persulfate together with sodium metabisulfite. Oil soluble (monomer soluble) initiators include, for example, azo compounds such as azobisisobutyro-nitrile; and peroxides such as benzoyl peroxide, methyl ethyl ketone peroxide, alkylperoxycarbonates such as di-2-ethylhexyl peroxydicarbonate and di(sec-butyl)peroxydicarbonate and alkyl-peroxycarboxylates such as t-butyl peroxyisobutyrate, 2,5-dimethyl-2,5-bis(2,3-ethylhexanoylperoxy)hexane, and t-butyl peroctoate. The preferred water-soluble polymerization initiator is potassium persulfate and the preferred oil-soluble polymerization initiators are alkylperoxycarbonates and alkylperoxycarboxylates for fast curing time.

Most preferable alkylperoxycarbonates are branched at the 1-carbon position and most preferable alkylperoxycarboxyl-ates are branched at the α-carbon position and/or 1-carbon position. These branched alkylperoxycarbonate peroxide can be represented by the formula:

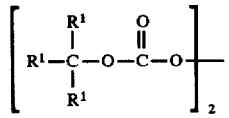

where $R^1$ is independently $C_1$ to $C_{16}$ hydrocarbons or hydrogen in which at least two of the $R^1$ are hydrocarbon groups.

The preferred branched alkyl carboxylate peroxide can be represented by the formula:

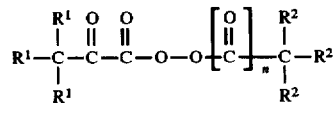

n = 0, 1 where $R^1$ and $R^2$ are independently $C_1$ to $C_{16}$ hydrocarbon groups or hydrogen in which at least two of the $R^1$ or $R^2$ are hydrocarbon groups. Preferably at least two of both $R^1$ and $R^2$ are hydrocarbon groups. Hydrocarbon groups can be alkyl, alkenyl or aryl groups.

The water-soluble initiators and/or oil-soluble initiators should be present in an effective amount to cure (polymerize and to crosslink) the monomers so that the monomers are substantially polymerized and crosslinked prior to significant diffusion of monomers between the two emulsions. Typically the initiator can be present from about 0.005 to about 15 weight percent based on the monomers. The initiators can be introduced with the oil phase or the aqueous phase before or after formation of the high internal phase emulsion.

A water-soluble initiator such as potassium persulfate can be added to the aqueous solution before forming the emulsions or to the emulsions. An oil-soluble initiator can be added to the monomer solution or an advanced monomer solution or to the emulsion. Addition of a polymerization initiator to an high internal phase water-in-oil emulsion is described in U.S. Pat. No. 5,210,104, the disclosure of which is herein incorporated by reference. The initiator added to the emulsion can optionally be blended into the emulsion by any blending technique such as, for example, static mixer or a pin mixer at a low shear rate, to form a curable water-in-oil high internal phase emulsion. The rate of shear must be high enough to blend the initiator but low enough not to allow the emulsion to coalesce or liquify.

Conveniently, the initiators can be added to the oil phase (monomer phase) or aqueous phase prior to formation of the emulsion. Alternatively, at least a portion of the monomer solution can be advanced (partially polymerized) in the presence of an effective amount of an advancement initiator or by a free-radical-producing radiation source to produce an advanced monomer component prior to formation of the emulsion to reduce curing time.

To form a stable high internal phase emulsion requires that a surfactant be included in the emulsion. Such surfactant must be soluble in the oil phase used to form the emulsion. The surfactant may be nonionic, cationic, anionic or amphoteric provided the surfactant or combination of surfactants are effective to form a stable high internal phase emulsion. Preferred types of surfactants that can be used include sorbitan fatty acid esters, polyglycerol fatty acid esters, polyglycerol fatty acid esters, polyoxyethylene fatty acids and esters. In particular, sorbitan fatty acid esters such as sorbitan monolaurate ("SPAN® 20"), sorbitan monooleate ("SPAN® 80"), and combinations of sorbitan trioleate ("SPAN® 85"), and sorbitan monooleate. One such surfactant combination is the combination of sorbitan monooleate and sorbitan trioleate in a weight ration greater than or equal to about 3:1, more preferably about 4:1. Another acceptable surfactant in "TRIODAN® 20" which is a polyglycerol ester available from Grindsted and "EMSORB 252" which is a sorbitan sesquioleate available from Henkel.

Between about one and about thirty percent by weight of surfactant, based on the monomers in the oil phase, is generally sufficient, with higher oil to water ratios and higher mixing and curing temperatures generally requiring more surfactant than lower oil to water ratios and temperatures.

The type of surfactant used in making the high internal phase emulsions that are to be polymerized is important in forming water-in-oil high internal phase emulsion and the final properties of the polymerized foams obtained. The surfactants are typically added to the monomer phase (oil phase).

The amount of surfactant system must be such that a water-in-oil high internal phase emulsion will form. Generally, the surfactant system is present in an amount effective to form a water-in-oil high internal phase emulsion. Preferably, the surfactant system can be present in concentrations of from about 0.1 to about 40 weight percent, more preferably about one to about thirty weight percent based on the monomers of the particular emulsion. When saccharide fatty acid esters are used as a component of the surfactant the saccharide fatty acid surfactants are preferably present from about 0.1 weight percent to about 36 weight percent, more preferably from about 0.1 to about 25 weight percent based on the monomers. When sorbitan fatty acid esters are used as a component of the surfactant the sorbitan fatty acid ester surfactants are preferably present from about 2 weight percent to about 36 weight percent, more preferably from about 5 weight percent to about 25 weight percent based on the monomers.

The relative amounts of the aqueous phase containing water and an electrolyte and monomer phase containing monomers and surfactants used to form the high internal phase emulsions are a factor in determining the structural, mechanical and performance properties of the resulting polymeric foam phases. The ratio of water and oil in the emulsions can influence the density, cell size, and specific surface area of the foam phase. To form a polymeric foam phase with suitable density and high absorption capacity, the water-in-oil high internal phase emulsions typically contain as the internal phase, at least about 90 weight percent of water, based on the emulsion, corresponding to a water to oil weight ratio of at least about 9:1, more preferably at least about 95 weight percent of water, most preferably at least about 97 weight percent of water, corresponding to a water to oil weight ratio of at least about 33:1.

The internal aqueous phase preferably contains a water-soluble electrolyte to stabilize the emulsion and to make the foam more water wettable. Suitable electrolytes include inorganic salts (monovalent, divalent, trivalent or mixtures thereof), for example, alkali metal salts, alkaline earth metal salts and heavy metal salts such as halides, sulfates, carbonates, phosphates and mixtures thereof. Such electrolyte includes, for example, sodium chloride, sodium sulfate, potassium chloride, potassium sulfate, lithium chloride, magnesium chloride, calcium chloride, magnesium sulfate, aluminum chloride and mixtures thereof. Mono- or divalent salts with monovalent anions such as halides are preferred.

The formation of a water-in-oil high internal phase emulsion is dependent on a number of factors such as the monomers used, water to oil ratio, type and amount of surfactant used, mixing conditions, presence and the amount of water-soluble electrolyte. It has been found that by adding a quaternary salt to a primary surfactant such as sorbitan fatty acid ester or saccharide fatty acid ester, a stable emulsion can be formed and high water to oil ratio can be achieved resulting in high fluid absorption capacity foams.

The formation of a water-in-oil emulsion is described in U.S. Pat. Nos. 4,522,953, and 5,149,720, the disclosures of which are incorporated herein by reference. In general, to form the water-in-oil emulsion, the water can be mixed in any way up to a water to oil ratio of about 4:1. An oil-in-water emulsion may result if the water was added all at once beyond a water to oil ratio of about 4:1. Typically, the water is therefore added gradually with a moderate rate of shear. A small capacity mixer such as a paint mixer with a shear rate of at least about 5 s$^{-1}$, preferably at least about 10 s$^{-1}$ can be used to mix the water-in-oil emulsion. A larger mixer equipped with an impeller with a shear rate of at least about 10 s$^{-1}$ or a pin gap mixer with a shear rate of at least about 50 s$^{-1}$, preferably at least about 100 s$^{-1}$ can also be used. If the shear rate is too low, the water-in-oil emulsion may revert to a oil-in-water emulsion. It is desirable to at least have a water to oil ratio of about 9:1, preferably at least about 19:1, more preferably at least about 30:1 for a high absorbency capacity foam.

A high internal phase emulsion can be prepared in batches or continuously. To form the high internal phase emulsion in batches, the emulsion is formed in a vessel or a container by gradually adding an aqueous phase to a monomer mixture and/or advanced monomer mixture under a moderate rate of shear until the desired water to oil ratio is reached.

An individual high internal phase emulsion can be prepared continuously by initially preparing a preformed emulsion of approximately the same character as the desired emulsion by the method described above, then introducing into the preformed emulsion, both the aqueous phase and/or the oil phase in such proportions so as to produce the desired emulsion at a desired rate of production of emulsion. The emulsified mass is maintained in a state of continuous shear sufficient to reduce the effective viscosity of the mass near to that of the introduced phase but not above the inherent shear stability point of the desired emulsion. The prepared emulsion is then withdrawn at the desired rate.

The aqueous phase and the monomer phase for the batch process and the continuous process can be introduced in a mixing vessel by an aqueous stream or a monomer stream, respectively, through one or more inlets. The streams can be combined prior to or after entering the mixing vessel then mixed in such a way to produce the desired emulsion. The mixing vessel is any container in which the high internal phase emulsion is made regardless of the type of mixer or mixer head used.

The emulsion is preferably polymerized and cured at a temperature within the range of about 25° C. to about 90° C., as long as the emulsion is stable at the curing temperature. Alternatively, a multiple-step process as described in U.S. Pat. No. 5,189,070 issued Feb. 23, 1993, the disclosure of which is herein incorporated by reference, can also be used. In the multi-step process the emulsion is pre-cured at a temperature of less than about 65° C. until the emulsion has a Rheometrics dynamic shear modulus of greater than about 500 pascal, (lightly gelled, having a consistency like a jelly or a gelatin referred to as "gel"), then cured at a temperature of above about 70° C. for a time effective to cure the gel. The cure can be as high as about 175° C. under a pressure sufficient to prevent the aqueous phase from boiling.

The emulsions can be heated, for example, by hot water, hot air, steam, electron beam radiation ("EBR"), radio frequency ("RF"), microwave or ohmic heating. The emulsions should be cured until the desired properties are obtained. Typically, to obtain a cured foam, the emulsions should be cured for at least about 8 hours, at 60° C. or at least about 1 hour at 60° C. then 3 hours at a temperature of above about 70° C. Generally, the extent of reaction after curing is at least about 85% of the monomers, preferably at least about 90%, more preferably at least about 95% (i.e., less than about of free monomers), most preferably at least about 99% (i.e., less than about 1% of free monomers) in order to obtain good properties.

In the practice of the present invention, the emulsion may be formed in batches or continuously, but the emulsion is placed on a continuous polymer film continuously in order to have a relatively continuous curing of the emulsion. The polymeric film is preferably polyproplyene, but could be another material that does not adhere to the cured emulsion, and does not cause the emulsion to break at the surface of the film. Polypropylene is convenient because it has these properties, is readily formed into a film, is inexpensive and can be recycled.

After being placed on a continuous film, the film is closed around the emulsion. The film can be simply laid over the emulsion in an overlapping fashion, or edges of the film can be interlocked with a mechanical closing zip-lock. Alternatively, the film edges can be sealed together using, for example, a heat seal or adhesive. A continuous tube of the emulsion in the film is therefore created. This continuous film is then more easily cured and handled after curing. The film is then preferably removed from outside of the cured emulsion, and the cured emulsion is then further processed, by for example, slicing the emulsion into thinner pieces, removing water and drying the emulsion.

The emulsion could be placed on the continuous sheet in a thickness such that slicing of the resultant cured foam to thinner sheets is not necessary. If a relatively thin sheet of emulsion is cured on the continuous sheet so that slicing is not necessary, the continuous sheet could be a material that adheres to the cured foam, and the continuous sheet could then function as a backing sheet to the foam. Slicing of the cured foam could also be avoided by layering films and emulsion repeadily, so that a significant thickness, for example four inches, of emulsions could be cured at one time, and then separated by pulling apart film sheets between the layers. In some end-uses, it could be beneficial to have such backing sheet be impervious to liquids. For example, having the impervious backing sheet impervious to liquids could be useful in a diaper.

Referring now to FIGS. 1, 1A,of the an embodiment of the present invention is shown schematically. Emulsion 1 is placed in a film 2. The film is initially on a roll 3, and is pulled off the roll in as a doubled sheet. The doubled sheet is spread by spreading rollers 4, to provide a vertical pocket 5 for the emulsion. The film could alternatively be on a single layer roll, and doubled to form a pocket by guiding rollers or wires. The emulsion is placed in the pocket by, for example, a distribution manifold 6. A tank 7 is provided for either holding an emulsion made by a batch process or for holding a volume of emulsion that is being prepared continuously. The emulsion can be pumped by pump 8 through recycle piping 11 to a static mixer 9 with a slip stream of emulsion being routed through a control valve 10 to the distribution manifold 6.

The film 2 is provided with an interlocking seal along the edges of the film, with a bead 12 on one edge and a locking edge 13 along the other edge. After the emulsion is placed in the vertical pocket 5, the edges are locked by a zipper fitting 14. The emulsion in the locked film is then wrapped onto a spool 15 for curing. Multiple spools 15 can be provided so that when one spool is full, the emulsion loaded onto that spool can be cured and another spool can be used to store the emulsion that is being place, at that time, onto the continuous polymeric sheet 2. Changing spools can be accomplished, for example, by providing two clamps to seal a section of the sealed film that contains the polymer, and cutting the film between the clamps. The spools can be rotatable to enable the spools to pull the emulsion filled film along.

The pocket formed by the spreader rollers can be, for example, four inches wide and four feet high. A pocket of this dimension can hold the emulsion with a reasonable thickness of polypropylene film. When a spool is filled with emulsion filled film, a stiff band or a series of stiff bands can be placed around the outer most film pocket, and this stiff band will hold the outer most film pocket nearly vertical on the spool. It is preferably that the spool have a diameter of at least 85 feet in order to accommodate a significant volume of emulsion.

After the emulsion is cured, the cured emulsion can be unwrapped from the spool and further processed by, for example, slicing the cured emulsion into thinner slices, removing water, rinsing, and drying the cured emulsion.

Referring now to FIGS. 3, 3A, and 4, an alternative embodiment of the present invention is schematically shown. Emulsion 21 is placed on film 22 through a manifold 24. The film can be provided on a single layer roll 23. In the embodiment of these figures, the film is doubled over on top of the emulsion rarer than sealed, although the edges of the film could alternatively be sealed as in the embodiment of FIGS. 1, 1A. and 2. In the embodiment of FIGS. 3, 3A, and 4, the film is supported on horizontal conveyor belt 27 and a pocket is formed by vertical side conveyor belts 28 and 29. These conveyor belts can be, for example, interlocking wire belts, or reinforced elastomer belts that can withstand curing temperatures. The conveyor belts pull the emulsion filled film through a curing oven, 30. The emulsion in the film on the conveyor belt can be, for example, 4 to 6 inches deep, and about 4 to 6 feet wide. The curing oven is a very long oven, for example, 360 to 480 feet long, to enable a sufficient curing time with a reasonable conveyor belt speed, such as about one quarter to about two feet per second. Processing at the exit end of the curing oven 31 is continuous and can include slicing the cured emulsion using slicer 32, water removal in a squeezer 33, and collection of thin layers of dewatered foam on rolls 34.

These foams can be optionally post-cured to improve the foam properties. Post-curing of the foam can be carried out by heating the foams to a temperature of above about 75° C., preferably greater than 90° C. by steam, hot air or other heating source. Such heating may be performed in a heat exchanger, oven, over heated rollers, hot water, hot air, steam, electron beam radiation ("EBR"), radio frequency ("RF"), microwave or ohmic heating or by other means.

Once the curing and/or post-curing process is completed, the water incorporated in the foam may be removed or squeezed out, dried by heat or flashed by lowering the pressure to a suitable level to evaporate the remaining liquid to give the desired degree of dryness in the product foam. These drying techniques will preferably be used after the desired state of cure is developed in the foam material.

The foams of the present invention may be washed prior to, after or between drying stages (removing at least a portion of the water) to yield an absorbent block which is especially useful for the absorption of liquids. Typically, these foams are washed to reduce the electrolyte content of the foam with a solvent such as, for example, an alcohol, a low concentration electrolyte solution (lower concentration than the water phase) such as 1% calcium chloride solution or deionized water. The washed foams can be conveniently dried by squeezing the water and/or solvent out of the foams and air or heat drying.

We claim:

1. A process for curing a high internal phase emulsion to form a porous crosslinked polymeric material, the process comprising the steps of:

forming a high internal phase emulsion having at least one curable phase;

providing a continuous strip of polymeric film wherein the polymeric film is incompatible with each of the phases of the emulsion;

placing at least a portion of the emulsion continuously on the polymeric film;

closing the polymeric film around the emulsion;

spiraling the emulsion in the polymeric film onto a spool, wherein the spool rotates about an essentially vertical axis for storage of the emulsion during curing; and curing the emulsion within the polymeric film on the spool.

2. The process of claim 1 further comprising the step of dewatering the cured emulsion as it is removed from the spool after the emulsion is cured.

\* \* \* \* \*